Patented Sept. 15, 1936

2,054,317

UNITED STATES PATENT OFFICE 2,054,317

COLORED GRANULES AND PROCESS OF PREPARING THEM

Henry R. Gundlach, Baltimore, Md., assignor to Central Commercial Company, a corporation of Illinois No Drawing. Application April 27, 1933, Serial No. 668,226

8 Claims. (Cl. 91—72)

The practice of giving prepared roofing a surface layer of granulated slate, quartz, etc., embedded in the coating of hard asphaltic or bituminous compound, has given rise to a demand for "granules" (as this surface mineral matter is called), in a variety of colors and shades that cannot be supplied from nature, and attempts to produce them artificially have fallen short in uniformity and durability of coloring.

Most, if not all, of the difficulties are caused by unrecognized elements in the natural stone, on base mineral that have acted as stains or discolorants in degrees varying with the quantity and character of those elements.

Slate, for example, often contains oxides or silicates of iron, or both, in varying quantities and conditions, and prior attempts to color slate granules artificially have left these elements free to stain or mar the product.

In coating slate granules with fusible compositions bearing a pigment of chromium oxide, for instance, I have found that the coating will have a brownish stain, or tint, indicating that the iron has been dissolved or taken up by the coating composition. Like observations have been made with other materials.

The principal object of this invention is to provide artificially colored granules of uniform and durable colors and shades, and this is accomplished by using a plurality of coatings on the granules; the first acting to check or confine the effects of extraneous elements in the base mineral, and the last of which carries the pigment required to produce the color or shade sought, and is shielded by the first. Thus, the iron oxide, or other extraneous matter in the base mineral is taken up, or sealed in, by a primary coating, and the color bearing materials afterwards applied are allowed to function unhampered by stains in the base minerals.

The materials to be used for the coatings is somewhat a matter of choice, but I prefer to use fusible compositions applied in powdered form and quickly fused on the mineral base particles. A composition especially suitable for slate granules includes—

| | Pounds |
|---|---|
| Borax | 16 |
| Silica (powdered 60 mesh) | 20 |
| Red lead | 20 |
| Feldspar | 30 |
| Cryolite (sodium aluminum fluoride) | 20 |
| Potassium nitrate | 5 |

And with the exception of the borax these quantities may be varied ten to fifteen percent plus or minus, to suit special conditions or personal desires. I do not mean to indicate that the above are not suitable for other mineral base granules, but rather the contrary.

The coating compositions may be pre-made—mixed, fused, cooled, and ground to fine powder—or the ingredients may be mixed as powders and then applied to the granules. But, as a rule, preforming is more satisfactory.

The coating compositions would be classed as low melting point compositions, and rightly so, because they should fuse and coat the granules so quickly and at such relatively low temperatures as to avoid injuries to the base mineral of the granules or the color pigments.

The melting points of the above compositions may be raised by increasing the feldspar, decreasing the lead, or adding calcium oxide or magnesium oxide.

The following will serve as further examples of coating compositions:

| | |
|---|---|
| Lead oxide | 14.4 |
| Borax | 7.45 |
| Silica | 4.64 |

| | |
|---|---|
| Lead oxide | 17.6 |
| Borax | 4.6 |
| Silica | 7.44 |

| | |
|---|---|
| Feldspar | 25 |
| Flint | 5 |
| Red lead | 15 |
| Plaster | 1 |

The basic raw materials for granules to be prepared according to this invention is a matter of selection from available supply. Slate, trap, shale, quartzite, ganister, etc., are all usable, though as a rule quartzite will contain little material to produce stain.

The selected minerals should be crushed, screened, etc., as usual. This process relates only to the coloring.

About twenty-four (24) pounds of coating composition to a ton granules is a good average practice for the first coat. The exact quantity may be varied, of course, to suit the base mineral. Where it contains much staining ingredients more coating composition is required than where it contains little staining ingredients.

The powdered coating composition is mixed with the granules, heated quickly to fuse the composition and agitated to prevent agglomeration. Sometimes a small amount of adhesive will assist in making the mixture temporarily adhere to the granules; a little water serves the purpose well; some may prefer an animal or vegetable adhesive, or silicate of soda, etc. for this purpose.

In general, the familiar rotary kiln will be found satisfactory for the purpose, but the charge should be put through the hot part of the kiln as quickly as possible. One to three minutes at 1000° F. to 1600° F. may be taken as a guide.

The granules thus coated are cooled somewhat and then mixed with about 20 pounds of coating composition to which has been added about 9 pounds of chromic oxide, if the granules are to be coated green, or 6 pounds of ferric oxide if they are to be coated red, etc., and put through the kiln again.

The two coating compositions, if both are of igneous material, are not necessarily the same, or of the same melting point. Theoretically, it would seem preferable to have the first coating of a higher melting point than the second, but practice does not justify the theory in all cases, for the powdered material of the second coating will fuse before the entire mass of the separate granules can be brought up to the same temperature. This fact makes it possible to use a somewhat higher melting point composition for the second coating without disturbing the first during the fusing operation.

The possible variations in procedure and in composition of coating material are great, and no attempt is made to catalogue them.

The principal feature of the invention is the use of one coating of some suitable material on the mineral granules to prevent stains or discolorants proceeding from the mineral into the outer coating bearing the pigment and thereby vitiating the color effects, and obviously with the foregoing explanation this can be accomplished in a great many ways.

I claim as my invention:—

1. The process of preparing granules of mineral matter suitable for use on composition roofing and which contains more or less coloring matter which includes fusing on the granules a protective coat, mixing the coated granules with color pigment and a composition containing approximately

|  | Pounds |
|---|---|
| Borax | 16 |
| Silica (powdered 60 mesh) | 20 |
| Red lead | 20 |
| Feldspar | 30 |
| Cryolite (sodium aluminum fluoride) | 20 |
| Potassium nitrate | 5 | and then fusing said composition onto the coated granules.

2. The process of preparing granules of mineral matter containing more or less coloring matter which includes coating the granules with a coating insoluble in water, mixing the coated granules with material in powdered form having color pigment therein and then fusing said last-named material upon said coated granules without fusing the first-named coating.

3. The process of preparing granules of mineral matter which includes mixing ground cementitious material of low fusing point with granules in the presence of heat above that of the fusing point of the material but below the temperature that would injure the granules for forming an insoluble coat on said granules, reducing the temperature below the fusing point of the material, mixing the coated granules with ground cementitious material of low fusing point and a color pigment, and then fusing said last-named material upon said granules without disturbing said coat.

4. The process of preparing granules of mineral matter suitable for use on composition roofing which includes fusing on the granules an insoluble coat for sealing the surface of each granule, mixing the coated granules with color pigment and a cementitious material in powdered form, and then subjecting the mass to a temperature of from 1000° to 1600° Fahr. from one to three minutes for fusing said material on the coated granule without an intermingling of the coats.

5. The process of preparing granules of mineral matter suitable for use on composition roofing which includes applying to the granules a coat for sealing the surface of each granule, fusing the same thereon, mixing the coated granules with a preformed ground cementitious material of lower melting point than said coat and color pigment, and then fusing the material onto the coated granules without disturbing said first coat.

6. A colored granule comprising a body portion of mineral matter having more or less coloring matter therein, said body portion being enveloped in a plurality of coats, the inner coat being fused on said granule and being free of extraneous color pigment when applied and the second coat being fused on the first coat, said second coat containing color pigment and being a reaction product of compositions comprising silica and an oxide of lead.

7. The process of preparing granules of mineral matter which includes encasing them in one or more coats of insoluble material free of color pigment to seal up stain producing ingredients, and overlaying with insoluble igneous material bearing color pigment, the first coat being applied at sufficiently high temperature to cause coloring matter to be exuded from the granule.

8. Composition roofing comprising a foundation felt impregnated with a bituminous composition, and colored granules secured to one face of said felt, each of said granules comprising a body portion of mineral matter having more or less coloring matter therein, said body portion being enveloped in a plurality of coats fused thereon, the inner coat comprising the fused product of a frit substantially free of color pigment and the outer coat comprising the following ingredients:—

|  | Parts |
|---|---|
| Feldspar | 25 |
| Flint | 5 |
| Red lead | 15 |
| Plaster | 1 | fused on said inner coat.

HENRY R. GUNDLACH.